United States Patent
Kochen

(10) Patent No.: US 12,240,765 B1
(45) Date of Patent: Mar. 4, 2025

(54) BORATE METHOD FOR MAGNETITE SYNTHESIS

(71) Applicant: Robert L. Kochen, Boulder, CO (US)

(72) Inventor: Robert L. Kochen, Boulder, CO (US)

( * ) Notice: Subject to any disclaimer, the term of this patent is extended or adjusted under 35 U.S.C. 154(b) by 0 days.

(21) Appl. No.: 18/907,700

(22) Filed: Oct. 7, 2024

Related U.S. Application Data

(62) Division of application No. 18/772,446, filed on Jul. 15, 2024.

(51) Int. Cl.
*C01G 49/08* (2006.01)
*C01B 35/10* (2006.01)

(52) U.S. Cl.
CPC .......... *C01G 49/08* (2013.01); *C01B 35/1027* (2013.01)

(58) Field of Classification Search
USPC .......................................... 423/632
See application file for complete search history.

(56) References Cited

U.S. PATENT DOCUMENTS

| | | | |
|---|---|---|---|
| 4,066,564 A * | 1/1978 | Sasazawa | C01G 49/08 427/127 |
| 5,595,666 A | 1/1997 | Kochen et al. | |
| 5,652,190 A | 7/1997 | Kochen et al. | |
| 2003/0185748 A1 * | 10/2003 | Sinha | C01G 49/08 423/632 |
| 2022/0371912 A1 * | 11/2022 | Martos | C01G 49/08 |

FOREIGN PATENT DOCUMENTS

CN 115159586 A * 10/2022

OTHER PUBLICATIONS

English translation of CN-115159586-A Description (Year: 2022).*
M.C. Mascolo et al., "Room Temperature Co-Precipitation Synthesis of Magnetite Nanoparticles in a Large pH Window with Different Bases," Materials, vol. 6, pp. 5549-5567, Nov. 2013.

* cited by examiner

*Primary Examiner* — Daniel Berns
*Assistant Examiner* — Zachary John Baum
(74) *Attorney, Agent, or Firm* — Patricia C. Brzostowicz; Superior Patent Group, LLC

(57) ABSTRACT

The present disclosure is drawn to a method for producing magnetite comprising the steps of: forming a ferrous ion solution; forming a ferric ion solution; and mixing and heating the ferrous ion solution and the ferric ion solution with a boric ion solution to precipitate magnetite. The disclosure is drawn to a borate method for producing magnetite wherein a ferrous ion compound and a ferric ion compound, in stoichiometric ratio of 1:2, are precipitated with a boric ion compound.

13 Claims, 5 Drawing Sheets

FeSO4 + Na2B4O7 —> FeB4O7(s) + Na2 SO4
Ferrous Sulfate + Sodium Borate —> Ferrous Borate + Sodium Sulfate $2Fe(NO_3)_3 + 3Na_2B_4O_7 \longrightarrow Fe_2(B_4O_7)_3(s) + 6NaNO_3$
Ferric Nitrate + Sodium Borate $\longrightarrow$ Ferric Borate + Sodium Nitrate $Fe(NH_4)_2(SO_4)_2 + Na_2B_4O_7 \longrightarrow FeB_4O_7(s) + Na_2SO_4 + (NH_4)_2SO_4$ Ferrous Ammonium Sulfate + Sodium Borate --> Ferrous Borate + Sodium Sulfate + Ammonium Sulfate 2FeNH4(SO4)2 + 3Na2B4O7 ⟶ Fe2(B4O7)3(s) + 3Na2SO4 + (NH4)2SO4
Ferric Ammonium Sulfate + Sodium Borate --> Ferric Borate + Sodium Sulfate + Ammonium Sulfate

FIG. 5

BORATE METHOD FOR MAGNETITE SYNTHESIS

The following application is a continuation application for patent under 35 USC 111 (a). The application is a divisional of and claims priority to U.S. patent application Ser. No. 18/772,446 filed Jul. 15, 2024 of common inventorship and by the same applicant.

FIELD OF THE DISCLOSURE

This disclosure relates to the field of chemical synthesis of magnetite.

BACKGROUND

Magnetite ($FeO \cdot Fe_2O_3(s)$, $Fe^{2+}Fe3+2O_4$, or $Fe_3O_4$), an iron, ferric, or ferrous oxide, is a ferrimagnetic, characterized as being attracted to a magnet and becoming magnetic itself, and is a mineral categorized in the oxides mineral group. Magnetite is useful for removal of actinides and heavy metals from contaminated water and can be regenerated.

Historically, magnetite is synthesized by many methods including ultrasound, irradiation, sol-gel and partial oxidation, with thermal decomposition and co-precipitation being the most commonly used methods. Co-precipitation methods involve the use of ferrous and ferric ions precipitated in alkaline solutions such as sodium hydroxide, potassium hydroxide, or ammonium hydroxide. Many magnetite co-precipitation methods are complex and require strict precipitation controls.

SUMMARY OF THE DISCLOSURE

The present disclosure is drawn to a magnetite produced by a method comprising the steps of: forming a ferrous ion solution; forming a ferric ion solution; and mixing and heating the ferrous ion solution and the ferric ion solution with a boric ion solution to precipitate magnetite. The method may further comprising after (c), cooling the heated solution. Additionally, The method may further comprise separating the magnetite. In another example, the method may further comprise drying the magnetite. In yet another example, the method may further comprise heating the magnetite. In another example, the method may comprise separating the magnetite. In another example, the method may further comprise drying the magnetite. In another example, the method may further comprise heating the magnetite.

In one embodiment the ferrous ion is a ferrous sulfate. In another embodiment the ferric ion is a ferric nitrate. In one embodiment the ferrous ion is a ferrous ammonium sulfate. In one embodiment the ferric ion is a ferric ammonium sulfate. In one embodiment the borate ion is chosen from a group of a sodium borate and a potassium borate. In one embodiment the borate ion is a sodium borate. In one embodiment the ferrous ion and the ferric ion are present in a stoichiometric ration of ferrous ion to ferric ion of 1 to 2.

The present disclosure is further drawn to a magnetite produced by a method comprising the steps of: dissolving in separate solutions ferrous sulfate and ferric nitrate in water; dissolving sodium borate in water; combining the dissolved ferrous sulfate and ferric nitrate and adding a stoichiometric amount of dissolved sodium borate to form ferrous borate and ferric borate precipitates and sodium sulfate and sodium nitrate supernatants; and heating the ferrous borate and ferric borate precipitates and sodium sulfate and sodium nitrate supernatants to boiling to form precipitated magnetite. The method may further comprise cooling the heated ferrous borate and ferric borate precipitates in the sodium sulfate and sodium nitrate supernatants. The method may further comprise separating the precipitated magnetite via filtration or one or more magnets or magnetic materials. The method may further comprise drying the magnetite. In one embodiment of the method, the stoichiometric ratio of ferrous sulfate to ferric nitrate is 1 to 2.

The present disclosure is also drawn to a method for producing magnetite, the method comprising the steps of: dissolving in separate solutions ferrous sulfate and ferric nitrate in water; dissolving sodium borate in water; combining the dissolved ferrous sulfate and ferric nitrate and adding a stoichiometric amount of dissolved sodium borate to form ferrous borate and ferric borate precipitates and sodium sulfate and sodium nitrate supernatants; and heating the ferrous borate and ferric borate precipitates and sodium sulfate and sodium nitrate supernatants to boiling to form precipitated magnetite and boric oxide supernatant.

The method may further comprise cooling the heated ferrous borate and ferric borate precipitates and sodium sulfate and sodium nitrate supernatants. The method of may further comprising separating the magnetite. The method may further comprise drying the magnetite. In one embodiment of the method the stoichiometric ratio of ferrous sulfate to ferric nitrate is 1 to 2.

BRIEF DESCRIPTION OF THE DRAWINGS

FIG. 5 is a chemical equation depicting obtaining ferric borate, sodium sulfate, and ammonium sulfate from ferric ammonium sulfate and sodium borate.

Figure 1:
FIG. 1 is a chemical equation depicting obtaining ferrous borate and sodium sulfate from ferrous sulfate and sodium borate.

Before explaining the disclosed embodiments of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DISCLOSURE

Terms

As used herein, a "ferrous ion" refers to elemental iron in its +2 oxidation state, denoted as $Fe^{2+}$. A ferrous ion may combine with other elements or compounds to form a "ferrous ion compound". Examples of ferrous ion compounds include but are not limited to ferrous chloride ($FeCl_2$), ferrous sulphate $FeSO_4$, ferrous nitrate $Fe(NO_3)_2$, ferrous ammonium sulfate $Fe(NH_4)_2(SO_4)_2$, ferrous borate $FeB_4O_7$, ferrous carbonate $FeCO_3$, and ferrous oxide $FeO$.

As used herein, a "ferric ion" refers to elemental iron in its +3 oxidation state, denoted as $Fe^{3+}$. A ferric ion may combine with other elements or compounds to form a "ferric ion compound". Examples of ferric ion compounds include but are not limited to ferric chloride ($FeCl_3$), ferric sulphate ($Fe_2(SO_4)_3$), ferric nitrate $Fe(NO_3)_3$, ferric ammonium sulfate $FeNH_4(SO_4)_2$, ferric oxide $Fe_2O_3$, and ferric borate $Fe_2(B_4O_7)_3$.

As used herein, a "borate ion" refers to borate in its −3 oxidation state, denoted as $BO_3^{3-}$. A borate ion may combine with other elements or compounds to form a "borate ion compound". Examples of borate ion compounds include but are not limited to sodium borate, $Na_2B_4O_7$, potassium borate, $K_2B_4O_7$, and boric acid, $H_2B_4O_7$.

As used herein, a "ferrous boric oxide intermediate" may be represented by the chemical formula $FeO \cdot 2B_2O_3$.

As used herein, a "ferric boric oxide intermediate" may be represented by the chemical formula $Fe_2O_3 \cdot 6B_2O_3$.

As used herein, "magnetite" is a solid mineral represented by the formula $FeO \cdot Fe_2O_3$ (s), wherein the "s" represents a solid.

As used herein, "sodium sulfate" is represented by the chemical formula $Na_2SO_4$.

As used herein, "sodium nitrate" is represented by the chemical formula $NaNO_3$.

As used herein, "boric oxide" is represented by the chemical formula $B_2O_3$.

As used herein, "ammonium sulfate" is represented by the chemical formula $(NH_4)_2SO_4$.

As used herein "Fe" indicates iron, "$SO_4$" indicates sulfate, "Na" indicates sodium, "B" indicates boron, "O" indicates oxygen, "N" indicates nitrogen, "H" indicated hydrogen, "S indicates sulfur, "$NO_3$" indicates nitrate, "$B_4O_7$" indicates borate, "$B_2O_3$" indicates boric oxide, and "$NH_4$" indicates ammonium.

As used herein, "s" or "(s)" denotes a solid, "l" or "(l)" denotes a liquid, "g" or "(g)" denotes a gas, and "aq" or "(aq)" denotes an aqueous, or water-based, solution.

As used herein, "a precipitate" is a solid formed by a precipitation reaction, the solid being insoluble in an aqueous solution, or supernatant, of the reaction.

A used herein, a "precipitation reaction" is a reaction that transforms a dissolved substance, being an element or compound, for example, into an insoluble solid from a supernatant solution.

As used herein, a "supernatant" is an aqueous solution, or soluble liquid fraction, in which one or more elements or compounds may be dissolved, after precipitation of insoluble solids.

As used herein, a "stoichiometric amount" or "stoichiometric ratio" of a reagent is the optimum amount or ration where, assuming that the reaction proceeds to completion, all of the reagent is consumed and therefore there is no deficiency or excess of the reagent.

As used herein, a "reagent" or "reactant" is an element, substance, or compound added to a system or reaction to cause a chemical reaction.

Common metric units are used throughout including but not limited to μg or ug, being microgram, mg, being milligram, g, being gram or grams, kg, being kilogram, μl or ul, being microliter, ml, being milliliter, l, being liter.

DESCRIPTION OF THE DISCLOSURE

Figure 2:
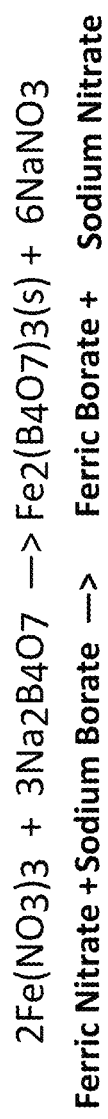
FIG. 2 is a chemical equation depicting obtaining ferric borate and sodium nitrate from ferric nitrate and sodium borate.
Figure 3:
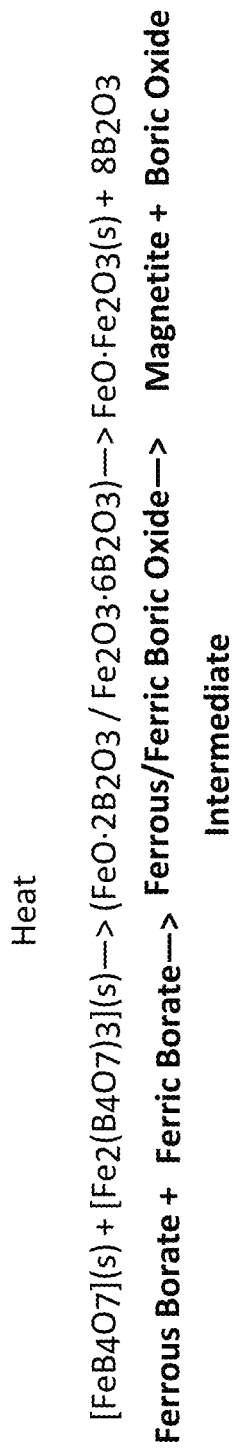
FIG. 3 is a chemical equation depicting obtaining a ferrous and ferric boric oxide intermediate from ferrous borate and ferric borate to produce magnetite and boric oxide.

The present disclosure is a magnetite formed via the method described herein and a method for synthesis of magnetite. As represented in FIG. 1, stoichiometric amounts of aqueous ferrous sulfate, FeSO4, $FeSO \cdot 7H_2O$ in solution, or other ferrous ion compound, is combined with stoichiometric amounts of aqueous sodium borate, also known as borax, or $Na_2B_4O_7$, $Na_2B_4O_7 \cdot 10H_2O$ in solution, to form ferrous borate, $FeB_4O_7$(s), as a solid precipitate and sodium sulfate, $Na_2SO_4$, in the aqueous supernatant. As represented in FIG. 2, stoichiometric amounts of aqueous ferric nitrate, $2Fe(NO_3)_3$, $Fe(NO_3)_3 \cdot 9H2O$, or other ferric ion compound, is combined with stoichiometric amounts of aqueous sodium borate, also known as borax, or $Na_2B_4O_7$, $Na_2B_4O_7 \cdot 10H_2O$ in solution, to form ferric borate, $Fe_2(B_4O_7)_3$ (s), as a solid precipitate and sodium nitrate, $6NaNO_3$, in the aqueous supernatant. As represented in FIG. 3, the ferrous borate (s) and ferric borate (s) in supernatants of sodium sulfate and sodium nitrate, respectively, are heated, forming ferrous boric oxide and ferric boric oxide intermediates, $FeO \cdot 2B_2O_3$ and $Fe_2O_3 \cdot 6B_2O_3$, respectively. Upon cooling, magnetite solid, $FeO \cdot Fe_2O_3$ (s), is formed and precipitates from a boric oxide, $B_2O_3$, aqueous supernatant.

Figure 4:
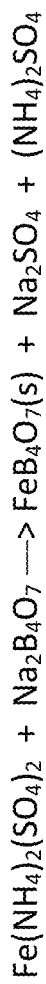
FIG. 4 is a chemical equation depicting obtaining ferrous borate, sodium sulfate, and ammonium sulfate from ferrous ammonium sulfate and sodium borate.

Alternate methods for forming ferrous borate and ferric borate are represented in FIGS. 4-5. As represented in FIG. 4, stoichiometric amounts of aqueous ferrous ammonium sulfate, $Fe(NH_4)_2(SO_4)_2$, and sodium borate, $Na_2B_4O_7$ are heated to form ferrous borate precipitate, $FeB_4O_7$ (s), with sodium sulfate, $Na_2SO_4$, and ammonium sulfate, $(NH_4)_2SO_4$, dissolved in the supernatant. As represented in FIG. 5, stoichiometric amounts of aqueous ferric ammonium sulfate, $FeNH_4(SO_4)_2$, and sodium borate, $Na_2B_4O_7$ are heated to form ferric borate precipitate, $Fe_2(B_4O_7)_3$ (s), with sodium sulfate, $Na_2SO_4$, and ammonium sulfate, $(NH_4)_2SO_4$, dissolved in the supernatant. Following reactions depicted in FIGS. 4-5, mixtures of ferrous borate precipitate with sodium sulfate and ammonium sulfate supernatants, from the FIG. 4 reaction, and ferric borate precipitate with sodium sulfate and ammonium supernatants, from the FIG. 5 reaction, are mixed and heated with the reaction proceeding as depicted in FIG. 3. Upon cooling, magnetite precipitates, leaving a boric oxide supernatant. The magnetite may be filtered from the supernatant or separated by other means including but not limited to magnetic separation. Following separation, the magnetite may be dried, either at ambient temperature or via heating, for example in an oven.

A simplified description of the disclosed method for magnetite synthesis, represented by the aforementioned steps, including either reactions depicted in FIGS. 1-3 or those depicted in FIGS. 4-5 and 3, is a method wherein ferrous ion compounds and ferric ion compounds are combined with borate ion compounds to generate magnetite precipitates. Alternate ferrous ion compounds for use in the reaction may include but are not limited to ferrous chloride ($FeCl_2$), ferrous sulphate $FeSO_4$, ferrous nitrate $Fe(NO_3)_2$, ferrous ammonium sulfate $Fe(NH_4)_2(SO_4)_2$, ferrous carbonate $FeCO_3$, and ferrous oxide FeO. Appropriate ferrous ion compounds would be those that are soluble in water. Alternate ferric ion compounds for use in the reaction may include but are not limited to ferric chloride ($FeCl_3$), ferric sulphate ($Fe_2(SO_4)_3$), ferric nitrate $Fe(NO_3)_3$, ferric ammonium sulfate $FeNH_4(SO_4)_2$, ferric oxide $Fe_2O_3$, and ferric borate $Fe_2(B_4O_7)_3$. Appropriate ferric ion compounds would be those that are soluble in water. Alternate borate ion compounds for use in the reaction may include but are not limited to sodium borate, $Na_2B_4O_7$, potassium borate, $K_2B_4O_7$, boric acid, $H_2B_4O_7$.

Wherein combined, ferrous and ferric borate precipitates remain stable at ambient room temperature indefinitely with no apparent formation of magnetite. Heating ferrous borate and ferric borate precipitates in aqueous solution to 100° C. rapidly completes said magnetite synthesis.

EXAMPLES

TABLE 1

Solutions Used in the Following Examples

| Solution | Ingredients |
|---|---|
| A | 1.20 g ferrous sulfate was dissolved in 15 ml water |
| B | 3.50 g of ferric nitrate was dissolved in 10 ml water |
| C | 6.61 g of sodium borate dissolved in 75 ml water |
| D | 1.65 g of sodium borate dissolved in 50 ml water |
| E | 4.94 g of sodium borate dissolved in 50 ml water |
| F | Ferrous ion compound dissolved in water |
| G | Ferric ion compound dissolved in water |
| H | Borate ion compound dissolved in water |

Example 1

As an example, synthesis of at least one gram of magnetite was attempted. All compounds used were reagent grade and distilled water was employed. For the reaction, 1.20 grams (g) ferrous sulfate was dissolved in 15 ml hot distilled water, wherein the water was heated to 60° C., to form a ferrous sulfate solution, solution A. An amount of 3.50 g of ferric nitrate was dissolved in 10 ml hot distilled water, wherein the water was heated to 60° C., to form a ferric nitrate solution, solution B. An amount of 6.61 g of sodium borate, borax, being a stoichiometric amount, was dissolved in 75 ml hot distilled water, wherein the water was heated to 60° C., to form a sodium borate solution, solution C.

The temperature of the water for all solutions created in all examples of the disclosure was chosen based on solubility. A range of water temperature may be used, however decrease in water temperature may result in reduced solubility. For example, three grams of sodium borate will dissolve in 100 ml of water at a temperature of 25° C., whereas 30 grams dissolves in 100 ml of water at a temperature of 60° C. Potassium borate, $K_2B_4O_7$, is more soluble in water and may be used as a substitute for sodium borate in all reactions and examples described in the disclosure.

The dissolved ferrous sulfate solution, solution A, and the ferric nitrate solution, solution B, were combined and added to the sodium borate solution, solution C. Upon combining the three solutions, the mixture was heated to boiling at 100° C. The suspension began to darken at a temperature of between 70° C. and 80° C. and magnetite precipitation began at occur between a temperature of 80° C. and 90° C. After reaching a temperature of 100° C., the mixture was cooled and the magnetite precipitated from the solution with boric oxide, $B_2O_3$ suspended in the supernatant. After precipitation the magnetite was filtered from the supernatant with Whatman No. 42 paper with a pore size of 2.5 micron and dried in a convection oven at 75° C. An amount of 1 g of magnetite was formed in the reaction.

Example 2

In another example, synthesis of at least one gram of magnetite was attempted. All compounds used were reagent grade and distilled water was employed. For the reaction, 1.20 grams (g) ferrous sulfate was dissolved in 15 ml hot distilled water, wherein the water was heated to 60° C., to form a ferrous sulfate solution, solution A. An amount of 3.50 g of ferric nitrate was dissolved in 10 ml hot distilled water, wherein the water was heated to 60° C., to form a ferric nitrate solution, solution B. The ferrous sulfate solution and ferric nitrate solution represent a 1:2 mole ratio. An amount of 1.65 g of sodium borate, borax, being a stoichiometric amount, was dissolved in 50 ml hot distilled water, wherein the water was heated to 60° C., to form a sodium borate solution, solution D. The sodium borate solution, solution D, was added to the ferrous sulfate solution, solution A, to form a ferrous borate precipitate and sodium sulfate supernatant, as represented by FIG. 1. Additionally, 4.94 g of sodium borate, a stoichiometric amount, was dissolved in 50 ml hot distilled water, as solution E, the water headed to 60° C., and added to the ferric nitrate solution B, as represented by FIG. 2. Ferric borate precipitated after combination of solution E with sodium nitrate supernatant. Each ferrous borate and ferric borate solution with their supernatants were combined and heated to boiling at 100° C., as represented by FIG. 3. The suspension began to darken at a temperature of between 70° C. and 80° C. and magnetite precipitation began at occur between a temperature of 80° C. and 90° C. After reaching a temperature of 100° C., the mixture was cooled and the magnetite precipitated from the solution with boric oxide, $B2O3$ suspended in the supernatant. After precipitation the magnetite was filtered from the supernatant with Whatman No. 42 paper with a pore size of 2.5 micron and dried in a convection oven at 75° C. An amount of 1 g of magnetite was formed in the reaction.

Example 3

In another example, 1.20 g ferrous sulfate ($FeSO_4 \cdot 7H_2O$) and 3.50 g ferric nitrate ($Fe(NO_3)_3 \cdot 9H_2O$), a 1:2 mole ratio, respectively, were combined and dissolved in 20 ml hot distilled water, of temperature of 60° C., to form a combined ferrous and ferric solution. Next, 6.61 g sodium borate, borax, ($Na_2B_4O_7 \cdot 10H_2O$), a stoichiometric amount, was dissolved in 75 ml hot distilled water, of 60° C., and added to the combined ferrous and ferric solution. This formed both ferrous borate and ferric borate precipitates with a supernatant of sodium sulfate and sodium nitrate. The ferrous borate and ferric borate precipitate solution with their supernatants were combined and heated to boiling at 100° C., as represented by FIG. 3. The suspension began to darken at a temperature of between 70° C. and 80° C. and magnetite precipitation began at occur between a temperature of 80° C. and 90° C. After reaching a temperature of 100° C., the mixture was cooled and the magnetite precipitated from the solution with boric oxide, $B_2O_3$ suspended in the supernatant. After precipitation the magnetite was filtered from the supernatant with Whatman No. 42 paper with a pore size of 2.5 micron and dried in a convection oven at 75° C. An amount of 1 g of magnetite was formed in the reaction.

Example 4

In another example, a ferrous ion compound, examples of which may include ferrous chloride ($FeCl_2$), ferrous sulphate $FeSO_4$, ferrous nitrate $Fe(NO_3)_2$, and ferrous ammonium sulfate $Fe(NH_4)_2(SO_4)_2$, may be dissolved in an appropriate amount of hot water of about 60° C., to form solution F. A ferric ion compound, examples of which may include but are not limited to ferric chloride ($FeCl_3$), ferric sulphate ($Fe_2(SO_4)_3$), ferric nitrate $Fe(NO_3)_3$, and ferric ammonium sulfate FeNH$_4$(SO$_4$)$_2$, may be dissolved in an appropriate amount of hot water of about 60° C., to form solution G. Appropriate amounts of the ferrous ion compound and the ferric ion compound represent a 1:2 stoichiometric ratio of ferrous:ferric ion compounds. A borate ion compound, or other class IIIA ion compound, for example sodium borate, Na$_2$B$_4$O$_7$, potassium borate, K$_2$B$_4$O$_7$, and boric acid, H$_2$B$_4$O$_7$, may be dissolved in an appropriate amount of hot water of about 60° C., to form solution H. Solution F and solution G may be combined and then added to solution H, and heated to boiling to form a magnetite precipitate. In an alternate method, solutions F+H may be combined, solutions G+H may be combined, following which the combination F+H and G+H may be combined and heated to boiling to form a magnetite precipitate. After precipitation, and alternately cooling, the magnetite may be filtered from the supernatant with Whatman No. 42 paper with a pore size of 2.5 micron, or separated by other means, and dried, if appropriate, in a convection oven at 75° C., or at air or ambient temperature.

Although the present invention has been described with reference to the disclosed embodiments, numerous modifications and variations can be made and still the result will come within the scope of the invention. No limitation with respect to the specific embodiments disclosed herein is intended or should be inferred. Each apparatus embodiment described herein has numerous equivalents.

What is claimed is:

1. A method for producing magnetite, the method consisting of the steps of:
    a) forming a ferrous ion solution;
    b) forming a separate ferric ion solution; and
    c) mixing and heating the ferrous ion solution and the ferric ion solution with a boric ion solution to precipitate magnetite.
2. The method of claim 1, wherein the ferrous ion is a ferrous sulfate.
3. The method of claim 1, wherein the ferric ion is a ferric nitrate.
4. The method of claim 1, wherein the ferrous ion is a ferrous ammonium sulfate.
5. The method of claim 1, wherein the ferric ion is a ferric ammonium sulfate.
6. The method of claim 1, wherein the borate ion is chosen from a group of a sodium borate and a potassium borate.
7. The method of claim 1, wherein the borate ion is a sodium borate.
8. The method of claim 1, wherein the ferrous ion and the ferric ion are present in a stoichiometric ratio of ferrous ion to ferric ion of 1 to 2.
9. A method for producing magnetite, the method comprising the steps of:
    a. dissolving in separate solutions ferrous sulfate and ferric nitrate in water;
    b. dissolving sodium borate in water;
    c. combining the dissolved ferrous sulfate and ferric nitrate and adding a stoichiometric amount of dissolved sodium borate to form ferrous borate and ferric borate precipitates and sodium sulfate and sodium nitrate supernatants; and
    d. heating the ferrous borate and ferric borate precipitates and sodium sulfate and sodium nitrate supernatants to boiling to form precipitated magnetite and boric oxide supernatant.
10. The method of claim 9 further comprising cooling the heated ferrous borate and ferric borate precipitates and sodium sulfate and sodium nitrate supernatants.
11. The method of claim 10 further comprising separating the magnetite.
12. The method of claim 11 further comprising drying the magnetite.
13. The method of claim 12, wherein the stoichiometric ratio of ferrous sulfate to ferric nitrate is 1 to 2.

* * * * *